July 29, 1958
E. L. KULHAVY
2,845,124
SHEET CODING MACHINE
Filed July 5, 1955
2 Sheets-Sheet 1
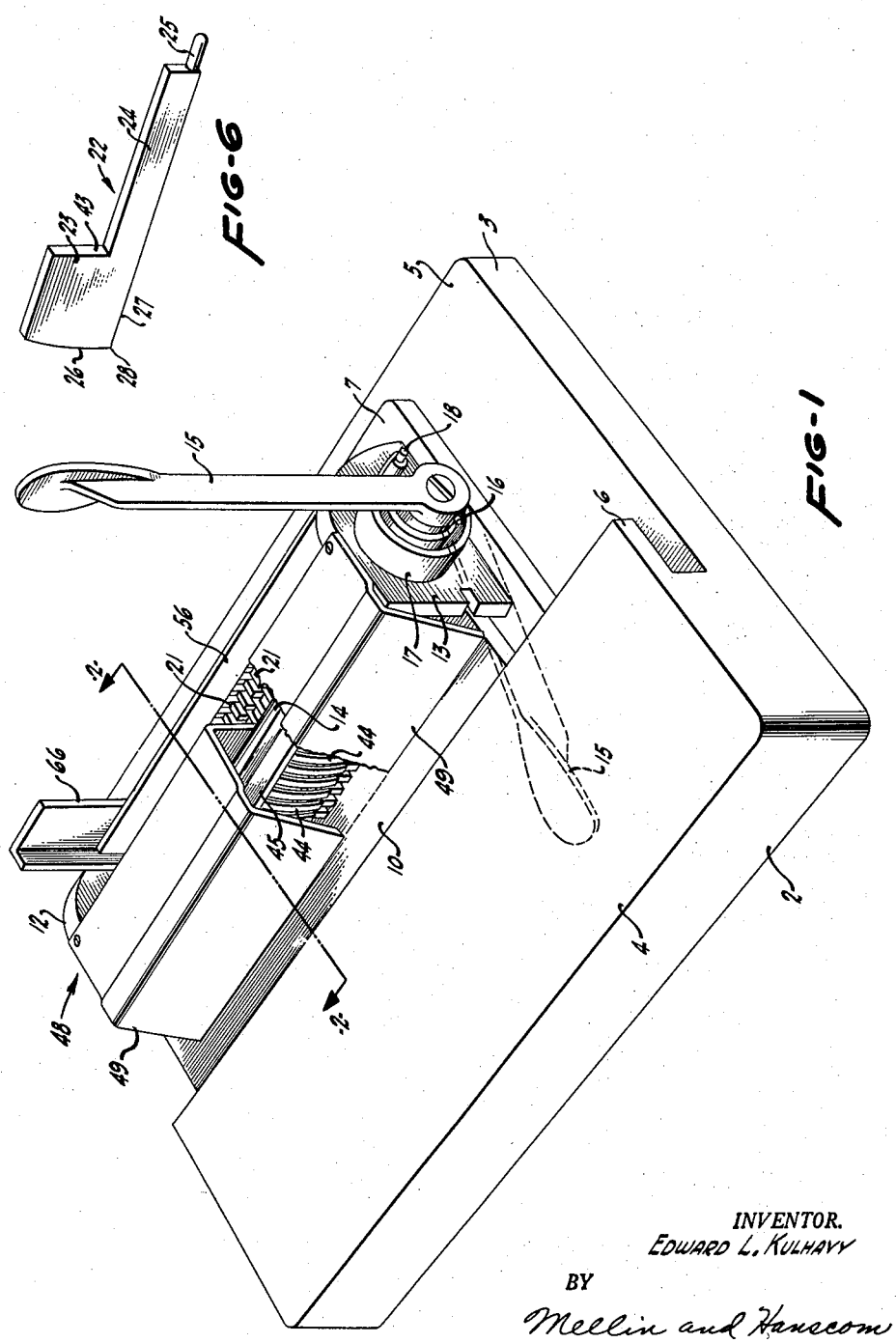
INVENTOR.
EDWARD L. KULHAVY
BY
Mellin and Hanscom
ATTORNEYS

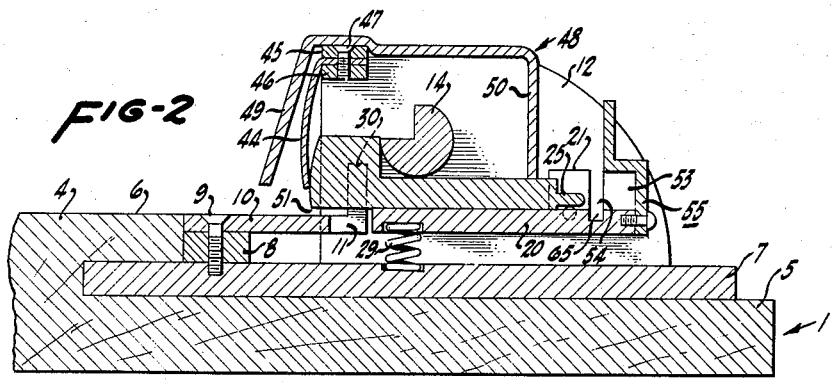
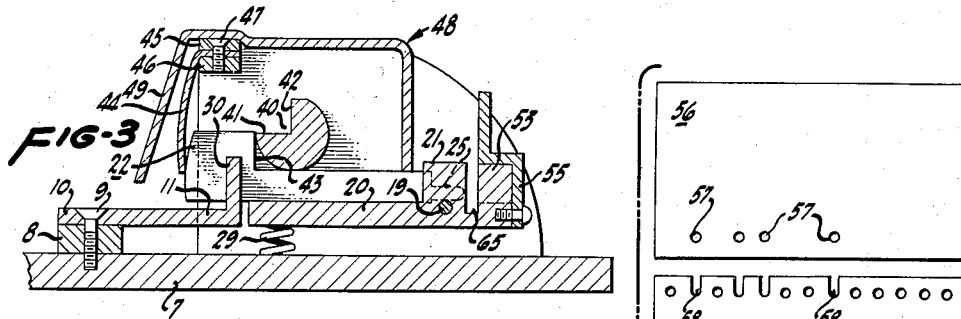
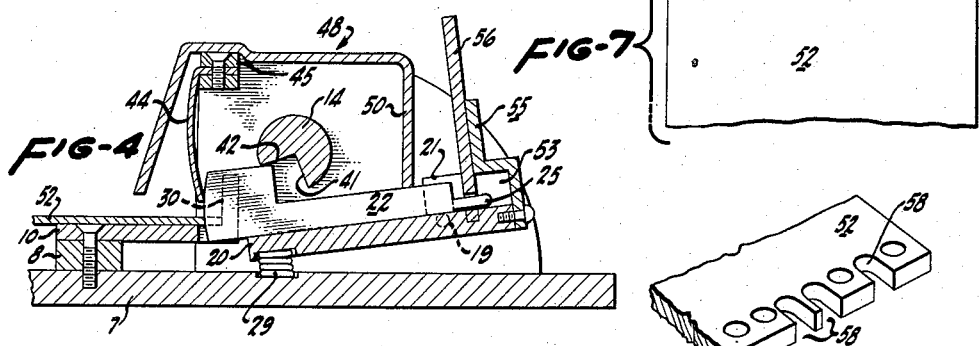
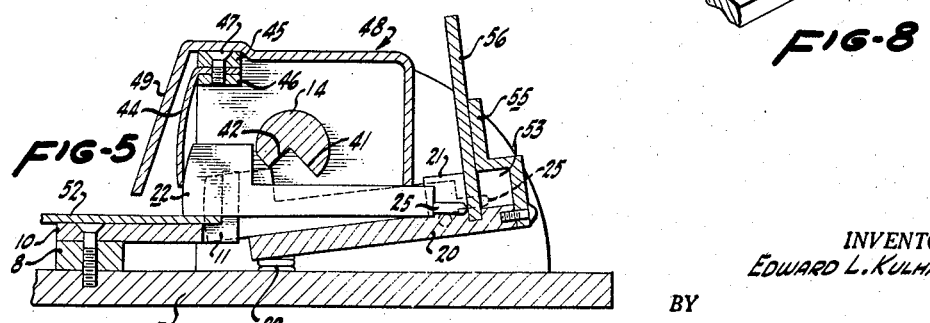

United States Patent Office 2,845,124
Patented July 29, 1958

2,845,124

SHEET CODING MACHINE

Edward L. Kulhavy, Oklahoma City, Okla.

Application July 5, 1955, Serial No. 519,733

3 Claims. (Cl. 164—114)

The present invention relates to code cards, and more particularly to apparatus for coding such cards.

One of the principal objects of the present invention is to provide a machine for the purpose of cutting, notching or perforating cards or sheets in accordance with a predetermined code.

A further object is to provide a machine for this purpose which may be controlled, in its operation, by the presence therein of a coded card.

It is an object of the invention to provide a card coding machine which may be used to deform one sheet in accordance with the code deformations on another card or sheet.

To illustrate one use of the present device, let it be assumed that credit customers of a retail store are each issued a credit card which is coded through spaced perforations or notches therein to represent his account number. Each store counter or department will be provided with one machine of the present invention. When a customer then makes a credit purchase, he presents his coded card to the sales person. The coded credit card is then placed in the control portion of the machine, and the store's copy of the sales ticket is then placed in the perforating portion of the device. When the machine is then operated, the code deformations borne by the credit card will be duplicated on the sales sheet.

The machine may be either manually or electrically operated, and if electrically powered, the control switch could be remotely located; for instance, the switch could be located in the credit department, and the machine could be actuated only by a member of the credit personnel. Such an arrangement will eliminate all mistakes in getting the sales amount debited to the proper account. It will also save time, on the part of the sales person, in making proper identification of the customer.

A further object of the invention is to provide a machine of this class which is compact, comparatively light in weight, and simple to operate.

Other objects will be apparent from the following description when taken in conjunction with the accompanying two sheets of drawings, wherein:

Fig. 1 is a perspective view of the machine of the present invention;

Fig. 2 is a vertical sectional view taken substantially along the line 2—2 of Fig. 1, the section being taken longitudinally through one of the card cutting bars or knives;

Fig. 3 is a similar view taken between two of said knives, showing the mechanism in its normal or non-operating position;

Fig. 4 is a similar view showing one of the knives being depressed to notch a sheet in the machine;

Fig. 5 is a similar view showing the formerly depressed knife returning to its normal position;

Fig. 6 is a perspective view of one of the card cutting knives;

Fig. 7 is a top view showing the master card, and a portion of a sheet which has been notched to correspond thereto;

Fig. 8 is a fragmentary perspective view of a card which has been coded by the machine of the present invention.

Referring now to the drawings, wherein like reference numerals are used to designate the same elements throughout the various views shown, reference numeral 1 indicates, as a whole, a substantially flat rectangular base preferably of wood, having a vertical front edge 2, and a parallel rear edge 3. The front portion of the base plate is considerably thicker than the remainder of the plate, and this thicker portion extends the full length of the plate. The thick portion of the plate has a smooth flat upper surface 4, while the upper surface of the remainder of the base plate is indicated by the reference numeral 5. The rear edge of the thicker portion of the base plate has an integral rearwardly projecting flange 6 which projects spacedly above, and lies parallel to the upper base plate surface 5.

Lying flatly upon the surface 5 of the base plate 1, with its front edge seated beneath the flange 6, is a flat rectangular table 7 which supports the mechanism of the present invention. A strip or cleat 8, resting on the upper surface of the table 7, extends along and abuts the rear free edge of the flange 6. Anchored to the upper surface of the strip 8 by a plurality of studs 9 is a guard plate 10, the rear edge of which is provided with spaced tines or arms 11 which project rearwardly, and the rear ends of which are bent upwardly to provide vertical guides 30 between which cutter knives may operate, as is more fully described hereinbelow.

Rigidly mounted on the upper surface of the table 7 is a pair of upstanding parallel brackets 12 and 13 which are transversely bored to journal the opposite ends of a rotatable camshaft 14. As the device is viewed in Fig. 1, the right-hand end of the camshaft 14 projects beyond the bracket 13 to receive one end of a lever arm 15 which is anchored to the shaft by a set-screw 16. A helical spring 17 surrounds the projecting end of the shaft 14 and has its inner end anchored to the shaft. The other or outer end of the spring 17 is anchored to the outer face of the bracket 13 by a horizontal pin 18. The spring arrangement is such that the lever arm 15 is urged by the spring to normally remain in an upright position, as illustrated in solid lines in Fig. 1. The free end of the arm 15 may be swung forwardly against the action of the spring 17 to the dotted line position of Fig. 1. Movement of the arm 15 acts to rotate the camshaft 14 through an operative angle between the extremes shown in Figs. 2 and 5 of the drawings.

Also extending between the two brackets 12 and 13 is a horizontal pivot pin or stationary shaft 19. The shaft 19 pivotally or rockably supports the rear portion of a horizontal panel 20 which extends from bracket to bracket, except for a working clearance. Adjacent said pivot pin 19, the upper surface of the panel 20 is provided with a series of spaced apart integral upwardly extending guide arms 21. The guide arms 21 are so located that the spaces therebetween are aligned with the spaces between the guide arms or tines 11 on the rear edge of the plate 10. Each aligned pair of said spaces complementally acts to nest a cutting blade 22 which is best illustrated in Fig. 6 of the drawings.

The cutting blades or knife members 22 are all identical in configuration, each comprising a single piece of metal shaped to provide: a forward end portion 23 which is substantially rectangular; a narrower elongated body portion 24 extending rearwardly from the end portion 23; and a reduced rearwardly projecting pin portion 25. The pin portion 25 might well be termed a feeler finger, as is more fully explained hereinbelow. The end portion 23 has a front vertical edge 26 which meets the lower horizontal edge 27 of the blade to form an abrupt cutting corner 28, and has a rearwardly presented vertical edge 43. The blades 22 are each slidably nested in one pair of said aligned spaces, so that the blade may move a slight distance longitudinally while resting upon the upper surface of the panel 20.

Positioned between the upper surface of the table 7 and the lower surface of the panel 20, adjacent the front edge thereof, is a plurality of helical expansion springs 29 which act to urge the front edge of the panel 20 upwardly to a normally horizontal position. (Figs. 2 and 3.) The camshaft 14 keeps the springs 29 from urging the front edge of the panel 20 above the point at which the panel becomes horizontal. Since the knives 22 extend along the upper surface of the panel 20, and therefore lie between the panel and the camshaft 14, upward movement of the front edge of the panel by the action of the springs 29 thrusts the body portions 24 into contact with the camshaft 14, thus halting such upward movement.

The camshaft 14 has a straight longitudinal groove 40 which extends the major portion of its length, said groove having two meeting side walls which lie perpendicular to each other. The groove 40 occupies approximately one-fourth of the otherwise circular periphery of the camshaft. The groove 40 is so located on the camshaft 14 that when the lever arm 15 is in its upright position (Fig. 1), the groove is presented forwardly and upwardly as depicted in Figs. 2 and 3. The two relatively perpendicular side walls of the groove 40 are indicated by the reference numerals 41 and 42. During the time the camshaft 14 is in its normal radial position, as shown in Figs. 1 and 2, its forwardly presented peripheral surface contacts the vertical rear edges 43 of all of the enlarged front portions 23 of the knives 22, and the knives are therefore thrust to their forwardmost positions on the panel 20. When the knives 22 are in their forwardmost positions, their rear pin portions 25 lie nested between the vertical guide arms 21.

As stated hereinabove, the knives 22 are slidable longitudinally along the panel 20. The knives are each urged in a rearward direction by one of a plurality of spring arms 44, all of which depend from a metal sill which extends between and is rigidly supported by the two end brackets 12 and 13. This sill is made up of two metal slats 45 and 46 which are held firmly together by a plurality of stud bolts 47. The upper rearwardly bent ends of all of the spring arms 44 are impinged rigidly between the sill slats 45 and 46. Each of the spring arms 44 depends individually along the front vertical edge 26 of one of the knives 22, and consequently, the knives are each individually urged in a rearward direction. However, so long as the camshaft 14 is in the radial position shown in Figs. 2 and 3, the knives are all held by the camshaft 14 against any rearward movement by the spring arms 44.

A sheet metal housing or cap 48 extends between the upper edges of the two end brackets 12 and 13, and the cap 48 is preferably provided with front and rear depending skirts 49 and 50 to enclose most of the working mechanism of the device.

It is pointed out that when the panel 20 is in its normal horizontal position, the knives 22 are supported a slight distance above the upper surfaces of the rearwardly projecting tines 11 of the guard plate 10, so as to provide a horizontal slot 51 beneath the front ends of the knives. This slot 51 extends beneath all of the knives, and provides sufficient vertical space to permit the rearward insertion of one edge of a horizontal sheet 52, which may be slid along the upper surface of the guard plate 10 and beneath the knives 22. The upwardly turned tines 11 of the plate 10 act to stop rearward movement of the sheet 52 in the slot 51, and the tines 11 further act to position the rear edge of the sheet 52 so that it lies at right angles to the knives 22. In Figs. 4 and 5, the sheet 52 is shown inserted into the slot 51 beneath the front cutting corners 28 of the knives. Since, as described hereinabove, each of the knives 22 lies between two of the tines 11, the cutting corners 28 of the knives could be pressed downwardly to cut notches in the rear edge of the sheet 52, provided the knives were first moved rearwardly to bring their cutting corners 28 beyond the rear edge of the solid portion of the guard plate 10. As also described hereinabove, the spring arms 44 act to urge the knives in a rearward direction, but due to the presence of the camshaft 14, the knives cannot normally move in such direction. It can readily be seen, however, that should the camshaft 14 be rotated on its own axis so as to present the longitudinal groove 40 toward the rear vertical knife edge 43, the knives 22 would all be freed so that the spring arms 44 could individually slide the knives longitudinally in a rearward direction (Fig. 4). It is pointed out, however, that should any of the knives 22 be held by any agency against such rearward movement by the spring arms 44, then those knives so held could not possibly be depressed, because their cutting corners would then lie upon the upper surface of the solid portion of the plate 10, and slightly in front of the forward ends of the tines 11.

As best illustrated in Fig. 3, the rearmost edge of the panel 20 is provided with a series of integral upstanding arms 53 which are spaced apart from each other to coincide with the spacing of the guide arms 21, which are also carried by the panel 20. The front edges of the arms 53 are spaced from the rear edges of the guide arms 21 to provide a vertical slot 54. Immediately in front of the forward edges of the arms 53, and directly beneath the slot 54, the upper surface of the panel 20 has a straight laterally extending groove 65, the purpose of which is more fully described hereinbelow.

The rear edges and also the upper edges of said arms 53 are preferably covered by a stepped housing plate 55 which projects upwardly above the front edges of the arms 53 in alignment with the rear wall of the slot 54. The slot 54 and the groove 65 act as a receptacle for holding a master card 56 in vertical position within the path of the rear end projections 25 on the knives 22. In other words, should an unperforated master card be placed in the slot 54 and groove 65, it would prevent rearward movement of all of the knives 22 by action of the springs 44. However, when the lower edge portion of the master card 56 is coded by spaced through perforations, such as perforations 57 of Fig. 7, the rear pin portions 25 on four of the knives are permitted to move rearwardly under action of said springs 44 because those four pins 25 may pass through the perforations 57 in the master card. Such rearward movement of one of the knives 22 is illustrated in Fig. 4 of the drawings, wherein the pin 25 is shown projecting through the master card 56. When one of the knives 22 is thus moved to the rearward end of its permitted travel, the front sheet cutting corner 28 is moved rearwardly beyond the solid portion of the guard plate 10, so that the corner 28 rests upon the paper sheet 52 directly over one of the spaces between the tines 11.

As also clearly illustrated in Fig. 4, when a knife 22 is moved rearwardly to the end of its travel, the upper surface of the enlarged portion 23 of the knife is moved rearwardly into the rotative path of the wall 42 or the camshaft groove 40. Counterclockwise rotation of the camshaft 14 beyond the position illustrated in Fig. 4 causes the groove wall 42 to force the front end of the knife downwardly through the sheet 52, so that the knife cuts a notch in the rear edge of the sheet. Four of such notches may be seen in Fig. 7, and are indicated by the reference numerals 58. It is to be noted that the notches 58 in the sheet 52 correspond in location to the code perforations 57 in the master card 56. This is in all cases true, regardless of the number or spacing of the code perforations 57 on the master card.

It is, of course, obvious that the cam 14 is partially rotated in a counterclockwise direction by one forward and downward stroke of the lever arm 15 from its solid line position (Fig. 1) to its dotted line position. It is also apparent that when the lever arm 15 is again returned to its vertical position, clockwise rotation of the cam 14 will return said knives 22 to their normal forwardmost positions (Figs. 2 and 3).

As a means for guiding the proper longitudinal position of the master card 56 in the slot 54 and groove 65, there is provided at one end of the table 7 a rigidly mounted upstanding angle post 66 against which the end of the card may be thrust.

While I have shown and described the preferred form of the invention, it is obvious that various changes may be made in its construction by those skilled in the art, without departing from the spirit of the invention as defined in the appended claims.

Having thus described my invention, what I claim and desire to secure by Letters Patent is:

1. In a machine for code-cutting paper sheets in accordance with a perforation coded master card, means forming a slot in said machine for receiving the sheets to be coded, a plurality of sheet cutting knife members shiftable independently into and out of actuated positions, feeler means integral with each knife member adapted to sense the presence of a card perforation, means forming a second slot in said machine for receiving a coded master card with the coding perforation of the coded card in longitudinal alignment with said knife member feeler means whereby said feeler means may enter the master card coding perforations to select which knife members may be moved into actuated positions, means independently urging each of said knife members into actuated position, a camshaft extending transversely of and rotatably mounted in said machine, said shaft normally retaining said knives in their non-actuated positions, means on said camshaft for releasing said knives for movement by said urging means upon initial rotation of said camshaft whereby certain of said knives will move into actuated position in accordance with the coded designation on said master card, and means on said camshaft engageable only with said actuated knife members to force said actuated knife members through said sheet upon further rotation of said camshaft.

2. In a machine for code-cutting paper sheets in accordance with a perforation master card, means forming a slot in said machine for receiving the sheets to be coded, a plurality of sheet cutting knife members shiftable into and out of actuated position, feeler means integral with each of said knife members adapted to sense the presence of a card perforation, means forming a second slot in said machine for receiving a coded master card with the coding perforation of the coded card in longitudinal registration with said knife member feeler means whereby said feeler means may enter the master card coding perforation to select which knife member may be moved into actuated position, a cam shaft extending transversely of and rotatably mounted in said machine, means on said knife members normally engaging said shaft to retain said knife members in their non-actuated position, and a longitudinal groove formed in said shaft whereby when said shaft is initially rotated said engaging means will be received in said groove and said knife members will be released for movement into actuated position in accordance with the coded designation on said master card, one edge of said groove being adapted to engage the upper surface of the actuated knife members and to force said actuated knife members through said sheets upon further rotation of said shaft.

3. In a machine for code-cutting paper sheets in accordance with a perforation coded master card, means forming a slot in said machine for receiving the sheets to be coded, a plurality of sheet cutting knife members shiftable into and out of actuated position, feeler means integral with each of said knife members adapted to sense the presence of a card perforation, means forming a second slot in said machine for receiving a coded master card with the coding perforation of the coded card in longitudinal registration with said knife member feeler means whereby said feeler means may enter the master card coding perforations to select which knife members may be moved into actuated position, means independently urging each of said knife members towards its actuated position, a camshaft extending transversely of and rotatably mounted in said machine, means on said knife members normally engaging said shaft to retain said knife members in their non-actuated position, and a longitudinal groove formed in said shaft whereby when said shaft is initially rotated said engaging means will be received in said groove and said knife members will be released for movement into actuated position in accordance with the coded designation on said master card, one edge of said groove being adapted to engage the upper surface of the actuated knife members and to force said actuated knife members through said sheets upon further rotation of said shaft.

References Cited in the file of this patent

UNITED STATES PATENTS

| | | |
|---|---|---|
| 2,233,662 | Buster et al. | Mar. 4, 1941 |
| 2,519,031 | Drachman | Aug. 15, 1950 |